United States Patent [19]

Herman

[11] Patent Number: 4,935,926
[45] Date of Patent: Jun. 19, 1990

[54] NETWORKING CIRCUITRY

[75] Inventor: Alexander Herman, Sharon, Mass.

[73] Assignee: Codex Corporation, Mansfield, Mass.

[21] Appl. No.: 420,662

[22] Filed: Oct. 10, 1989

Related U.S. Application Data

[63] Continuation of Ser. No. 244,943, Sep. 15, 1988, abandoned, which is a continuation of Ser. No. 35,505, Apr. 7, 1987, abandoned.

[51] Int. Cl.[5] .............................................. H04J 3/02
[52] U.S. Cl. ................................ 370/85.13; 340/825.5
[58] Field of Search ................ 370/85.9, 85.11, 85.12, 370/85.13, 85.14; 340/825.5, 825.05

[56] References Cited

U.S. PATENT DOCUMENTS

| | | | |
|---|---|---|---|
| 3,890,471 | 6/1975 | Hochenberg | 320/89 |
| 4,251,880 | 2/1981 | Baugh et al. | 370/89 |
| 4,340,776 | 7/1982 | Ganz et al. | 370/85.13 |

Primary Examiner—Joseph A. Orsino
Assistant Examiner—Frank M. Scutch, III
Attorney, Agent, or Firm—Fish & Richardson

[57] ABSTRACT

A data communication networking system for carrying messages among a plurality of data handling devices in accordance with a plurality of different networking modes, each device being compatible with at least one of the networking modes, the networking system including networking circuitry for interconnecting the devices effectively in accordance with different ones of the networking modes, and concentrator circuitry having control circuitry for providing signals indicative of the networking modes with which different devices are compatible, and routing circuitry responsive to the control circuitry for routing messages between a given device and the networking circuitry in accordance with one of the networking modes with which the given device is compatible.

2 Claims, 3 Drawing Sheets

NETWORKING CIRCUITRY

This is a continuation of copending application Ser. No. 244,943 filed on Sept. 15, 1988, now abandoned, which was a continuation of Ser. No. 035,505, filed Apr. 7, 87, now abandoned.

BACKGROUND OF THE INVENTION

This invention relates to data communication networks, for example so-called local area networks.

Such networks enable computers and other data handling devices to communicate.

As discussed in copending U.S. Pat. application Ser. No. 603,174, filed Apr. 23, 1984, assigned to the same assignee as this application, and incorporated herein by reference, in typical such networks all devices are connected to a common bus, which carries information packets between devices. In order to prevent collisions on the bus between different packets, some networks (called CSMA/CD for "carrier sense multiple access with collision detect") use circuitry which senses collision situations and aborts the transmission of packets that would collide. IEEE standard 802.3 for CSMA/CD networks specifies the use of four twisted pair lines for transmitting packets, receiving packets, receiving collision signals, and supplying power.

Other networks (called CSMA/CA, the last two letters referring to "collision avoidance") prevent collisions by allowing transmissions to occur only in accordance with a predetermined priority. In one type of CSMA/CA network (called a token ring network) the devices are connected in a logical ring by twisted pair links between adjoining devices. A "token" signal passes around the ring and determines what unit may transmit at a given time, thus avoiding collisions. Another IEEE standard (802.5) applies to token ring networks.

The copending application discloses an 802.3 network organized into subnetworks with collisions being prevented by a collision avoidance technique within each subnetwork, and by a collision detection technique between subnetworks. Within each subnetwork a wiring concentrator connects a number of 802.3 devices to the common bus shared by all networks. The concentrator contains circuitry for carrying out the hybrid collision avoidance and collision detection mode of operation.

SUMMARY OF THE INVENTION

In general, the invention features a data communication networking system for carrying messages among a plurality of data handling devices in accordance with a plurality of different networking modes, each device being compatible with at least one of the networking modes, the networking system including networking circuitry for interconnecting the devices effectively in accordance with different ones of the networking modes, and concentrator circuitry having control circuitry for providing signals indicative of the networking modes with which different devices are compatible, and routing circuitry responsive to the control circuitry for routing messages between a given device and the networking circuitry in accordance with one of the networking modes with which the given device is compatible.

In preferred embodiments, the system includes a mode signaling circuit associated with at least one of the devices for delivering to the control circuitry mode information indicative of the networking modes with which the device is compatible; each device is connected to the concentrator circuitry by a message transmission path conforming to one of the networking modes with which the device is compatible for carrying messages to and from the device, and the mode signaling circuit associated with the device is connected to send the mode information via a mode information transmission path; there are lines connecting the concentrator circuitry and each device, and the lines serve simultaneously as parts of both the message transmission path and the mode information transmission path, and the paths have decoupling arrangements for decoupling the messages from the mode information; the lines include first and second pairs for carrying messages respectively to and from the device, the control circuitry, the lines, and the mode signaling circuit together comprise a pair of direct current circuits, the levels of direct current carried in the direct current circuits carries the mode information, and the direct current circuits comprise decoupling arrangements (transformers and a capacitor) for decoupling the direct current levels carried over the lines from signals which carry the messages over the lines; each direct current circuit includes one side of the split winding of each transformer and one wire of each of the pairs; the system also includes fault circuitry responsive to the mode information transmission path for generating fault signals when the mode information is erroneous; the system includes bypass circuitry responsive to the fault circuitry for withdrawing the device from the networking circuitry when the fault signals are generated; there is fault indicator circuitry responsive to the fault circuitry for providing an alarm when the fault signals are generated; the fault circuitry includes deglitcher circuitry for inhibiting the fault circuitry from generating fault signals in response to preselected conditions; and the mode signaling circuit includes the conventional phantom circuits of a station interface unit compatible with IEEE standard 802.5.

Also in preferred embodiments, there are first and second networking modes, the control circuitry provides a signal to indicate that a device is compatible with the first mode, and provides no signal to indicate that a device is compatible with the second mode, and the routing circuitry routes messages in accordance with the first mode in the absence of a signal from the control circuitry, and in accordance with the second mode when a signal is received from the control circuitry; the networking circuitry comprises separate networks corresponding respectively to different networking modes, and the routing circuitry comprises switch means for effectively connecting each device to a network corresponding to a networking mode with which the device is compatible; one networking mode comprises interconnecting the devices effectively in a ring, and the routing circuitry is responsive to the control circuitry for establishing a connection between each device which is compatible with said one networking mode, and each of the two adjacent devices in the ring; a second networking mode comprises a CSMA/CD arrangement having a plurality of subnetworks, the concentrator circuitry includes collision avoidance and detection circuitry for avoiding message collisions within each subnetwork and detecting and preventing message collisions between subnetworks, and for devices compatible with the second networking mode, the routing circuitry routes messages via the collision avoidance and detection circuitry; the routing circuitry inhibits the collision avoidance and detection circuitry with respect to devices not compatible with the second networking mode; the routing circuitry interconnects the devices which are compatible with the token ring mode via twisted pair cable or via optical fiber cable and electro-optical conversion circuitry; the routing circuitry connects the twisted pair line so as to bypass devices not compatible with the token ring mode; and the CSMA/CD mode is defined by the IEEE 802.3 standard, and the token ring mode by the IEE 802.3 standard.

The invention thus enables a single concentrator to serve devices compatible with different networking modes automatically using signals generated by phantom circuitry already present in devices compatible with one of the networking modes. The two DC circuits each follow a path which includes a part of the split winding of each coupling transformer and one wire of each twisted pair, which maximizes the likelihood of detecting faults in the circuitry. The fault circuitry effectively and simply detects the faults, while the deglitcher minimizes the likelihood of erroneous fault signals. The token ring network automatically bypasses any faulty token ring device. When a token ring device is being served, the CSMA circuitry is inhibited to reduce the transmission of noise back through the concentrator to that device.

Other advantages and features will become apparent from the description of the preferred embodiment, and from the claims.

DESCRIPTION OF THE PREFERRED EMBODIMENT

We first briefly describe the drawings.

DRAWINGS

CIRCUITRY

Figure 1:
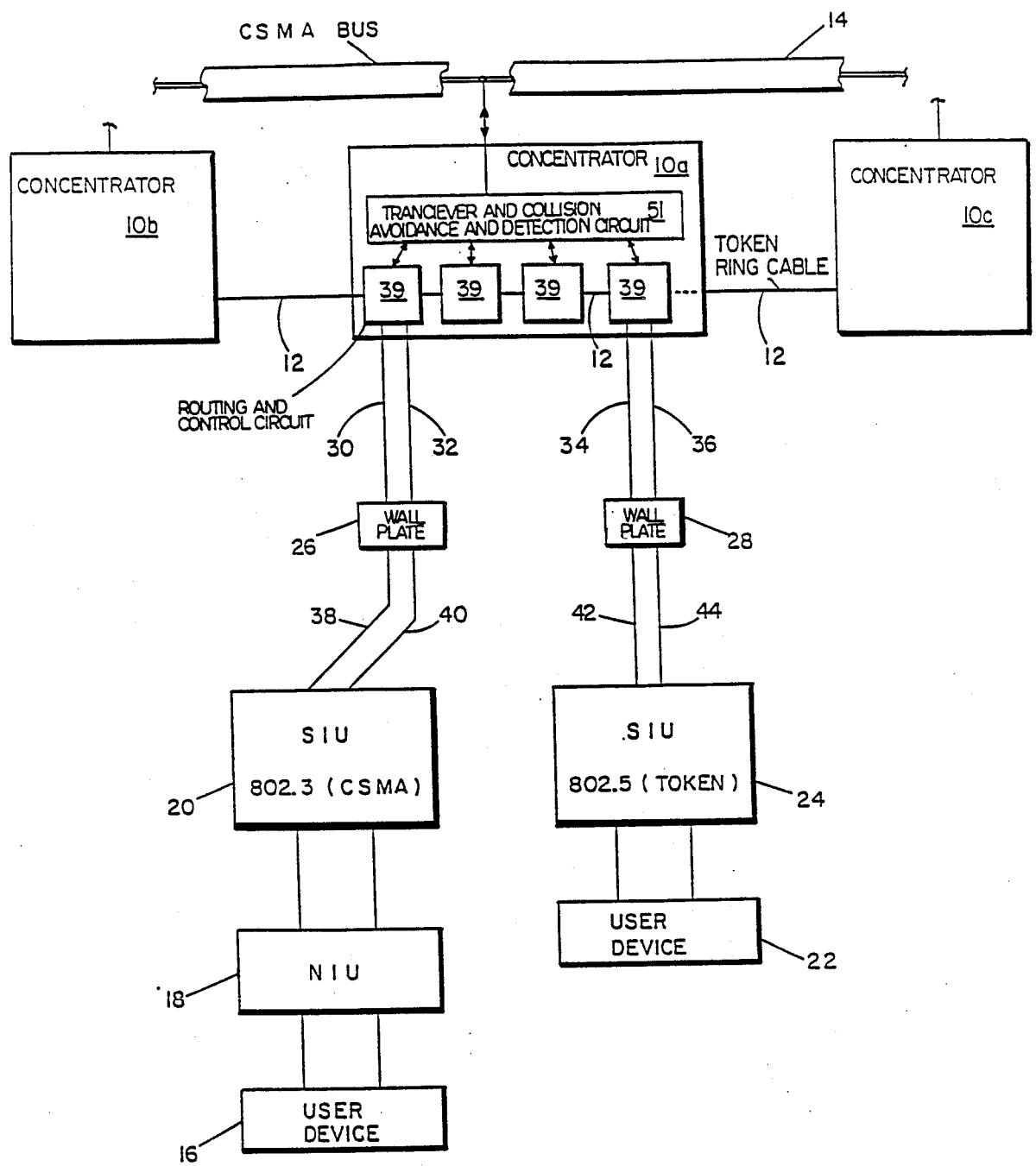
FIG. 1 is a block diagram of a representative portion of a local area network embodying the invention.

Referring to FIG. 1, wiring concentrators 10a, 10b, and 10b, 10c are connected to each other by twisted pair line 12 to form part of a first network operating in accordance with the IEEE 802.5 token ring standard, and are each also connected to coaxial bus 14 to form part of a second network operating in accordance with the IEEE 802.3 CSMA/CD standard.

Illustrative user device 16 is connected to concentrator 10a by two twisted pair lines through standard CSMA/CD network interface unit (NIU) 18 and station interface unit (SIU) 20 (of the type disclosed in the copending application), for connecting device 16 in the CSMA/CD network in combined collision detect and collision avoidance operation, all as disclosed in detail in the copending application.

Illustrative user device 22 is connected by two twisted pair lines to the same concentrator 10a through standard 802.5 type SIU 24, for connecting device 22 in the token ring network.

Wall plates 26, 28 (with an 802.5 type hermaphroditic connector) are respectively connected to concentrator 10a by twisted pair lines 30, 32, and 34, 36 and permit SIU's 20, 24 respectively to plug into concentrator 10a via twisted pair lines 38, 40, and 42, 44.

Other user devices (not shown) may similarly be connected to concentrator 10a for operation in either the 802.3 or the 802.5 mode. Concentrators 10b and 10c similarly support other groups of user devices. Each concentrator includes a number of identical routing and control circuits 39, each associated with one of the user devices. Adjoining circuits 39 are linked by line 12. Each concentrator also has a circuit 51 which includes a transceiver and collision avoidance and detection circuitry, all as disclosed in detail in the copending application. Each circuit 39 is linked to circuit 51.

Figure 2:
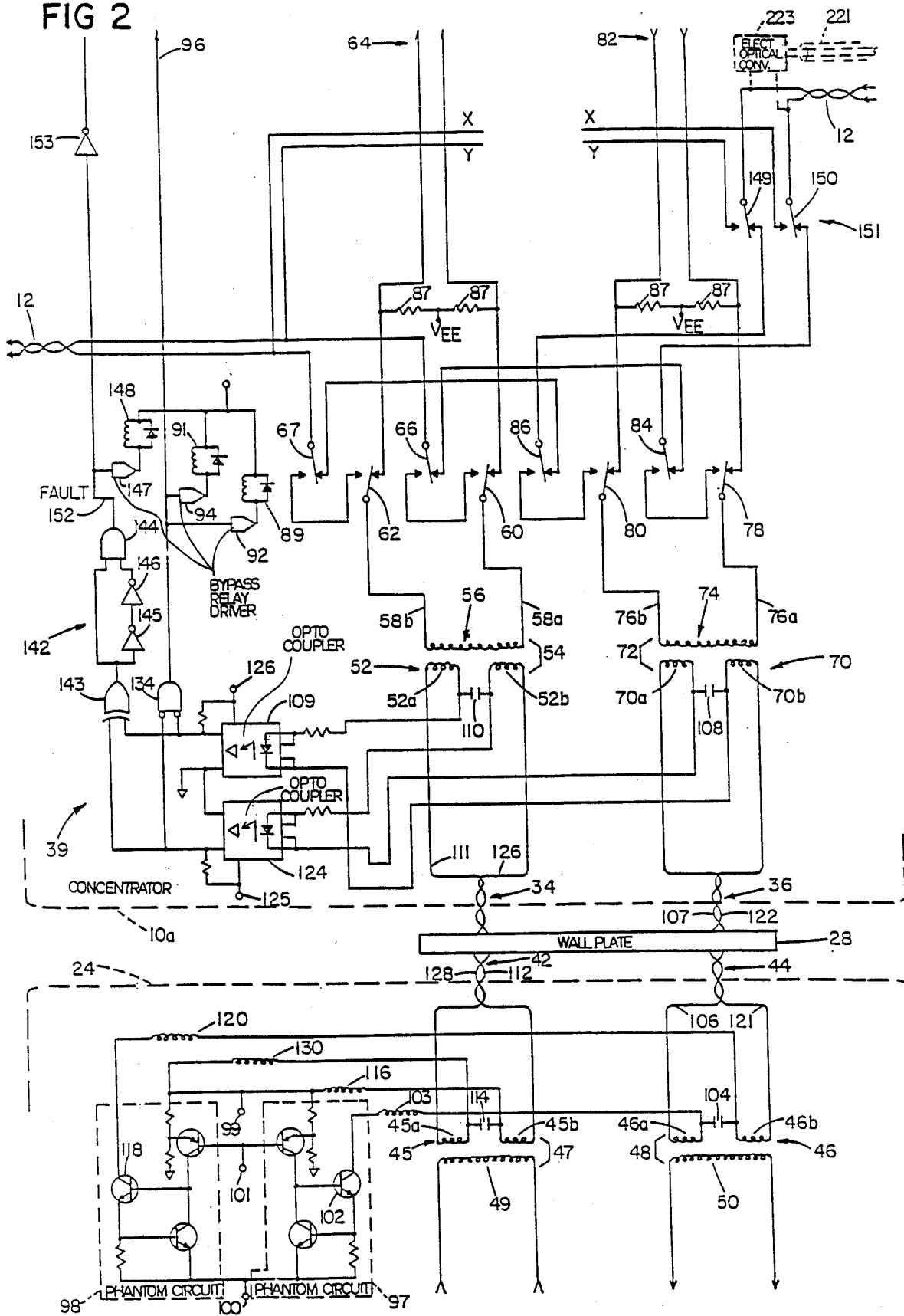
FIGS. 2 and 3 are schematic diagrams of portions of the network of FIG. 1.

Referring to FIG. 2 (which schematically illustrates a portion of the circuitry of SIU 24 and one lines 42, 44 respectively connect to split windings 45, 46 of transformers 47, 48 for respectively carrying transmitted and received information packets between the SIU 24 and concentrator 10a. Windings 49, 50 of transformers 47, 48 respectively connect to a user device (not shown) for respectively carrying transmitted and received information packets between the SIU and the user device.

Twisted pair line 34 connects to split winding 52 of transformer 54 in concentrator 10a (and also to twisted pair line 42 via wall plate 28). Winding 56 of transformer 54 (which is AC-coupled to split winding 52 to pass transmitted information packets) has two terminal wires 58a, 58b which respectively connect to relay armatures 60, 62. In a first position (shown in FIG. 2), relay armatures 60, 62 connect line 34 to transmission line 64. In a second position (the opposite position from the one shown) the relay armatures 60, 62 connect line 34 to relay armatures 66, 67 which then also occupy a position opposite to the one shown and thus connect twisted pair line 34 to 802.5 token ring standard line 12.

Twisted pair line 36 similarly connects to split winding 70 of transformer 72 (and also to twisted pair line 44 via wall plate 28). Winding 74 of transformer 72 (which is AC-coupled to split winding 70) has two terminal wires 76a, 76b which respectively connect to relay armatures 78, 80. In a first position (shown), relay armatures 78, 80 connect line 36 to receive line 82. In a second position (opposite to the one shown), relay armatures 78, 80 connect line 36 to relay armatures 84, 86 which then also occupy a position opposite the one shown and thus connect twisted pair line 36 of SIU 24 to IEEE 802.5 token ring standard line 12.

Impedance matching resistors 87 are connected across the two leads of transmission line 64 and receive line 82.

When relay armatures 66, 67, 84, 86 are all in the position shown, token ring standard line 12 is effectively connected to bypass the concentrator circuitry of FIG. 2 so that the associated SIU is excluded from the 802.5 network.

Relay armatures 66, 67, 84, 86 are electromagnetically coupled to relay coil 89 so that relay armatures 66, 67, 84, 86 occupy the 802.3 position shown while a relay coil 89 is not energized, but occupy the 802.5 position (opposite to the one shown) when relay coil 89 is energized. Relay armatures 60, 62, 78, 80 likewise normally occupy the 802.3 position shown except when relay coil 91 is energized. Relay coils 89, 91 are powered respectively by relay drivers 92, 94 which are both connected to a trigger line 96. Thus the signal on trigger line 96 determines whether relay armatures 60, 62, 66, 67, 78, 80, 84, 86 occupy the 802.3 or the 802.5 position, and thus determine whether information packets from an SIU are carried in the 802.5 or the 802.3 network.

SIU 24 and concentrator 10a include circuitry which generates and carries DC signals from SIU 24 to concentrator 10a to indicate that it is an 802.5 device and causes concentrator 10a accordingly to connect SIU into the 802.5 network. The DC signals sent from SIU 24 to concentrator 10a are carried over twisted pair lines 34, 36, 42, 44, which for this purpose are arranged to serve as parts of two separate DC paths. The DC signals originate in two standard phantom circuits 97, 98 already present in SIU 24.

In phantom circuit 97, supply voltages $+V_{BB}$ and $-V_{BB}$ are delivered at points 99, 100. A logical low applied to input 101 (e.g., by means of a voltage source controlled by a push button or by a switch which is automatically thrown by the insertion of lines 42, 44 into wallplate 28) effectively closes transistor switch 102. Inductor 103 carries the low level DC signal (while providing high frequency isolation) from transistor 102 to winding 46a of transformer 48. AC coupling capacitor 104 blocks the DC signal, forcing it to travel through one wire 106 of twisted pair line 44. Wire 107, in line 36 (connected to wire 106 in line 44), carries the current to winding 70b of transformer 72 in concentrator 10a. AC coupling capacitor 108 blocks the DC signal, forcing it into (and thereby enabling) opto coupler 109. The DC signal returns through winding 52a of transformer 54. Capacitor 110 blocks the DC signal, forcing it through one wire 111 of twisted pair line 34. Wire 112, in line 42 (connected to wire 111 in line 34), creates a path for the signal to return it to SIU 24. Winding 45b of transformer 47 passes the signal, blocked by capacitor 114 (like capacitors 104, 108, 110), through isolation inductor 116, thus completing one DC circuit.

Simultaneously, the logical low applied to input 101 effectively closes transistor switch 118 in phantom circuit 98. The resulting low level DC signal is carried in a second DC circuit made up of isolation inductor 120, winding 46b of transformer 48 (which cooperates with AC blocking capacitor 104), wire 121 of the twisted pair line 44, wire 122 in line 36, winding 70a of transformer 72, opto coupler 124, winding 52b of transformer 54, wire 126 of twisted pair line 34, wire 128 in line 42, winding 45a of transformer 47, and isolation inductor 130.

Thus each DC circuit includes one side of the split winding of each of the transformers 47, 48, 54, 72, and one of the wires of each twisted pair 34, 36.

The opto couplers 109, 124 (e.g., each an HCPL 3700) isolate the 802.5 SIU 24 controller power supply 99, 100 from the concentrator 10a power supply 125, 126. Each opto coupler produces a logical low output signal when it is enabled. Each low signal respectively feeds into the inverting inputs of a logical AND gate 134. When both of its inputs are low (indicating that SIU 24 is a 802.5 type device), AND gate 134 outputs a logical high signal onto trigger line 96, which simultaneously triggers both relay drivers 92, 94 to power relay coils 89, 91, switching relay armatures 60, 62, 66, 67, 78, 80, 84, 86 to the 802.5 position.

The outputs of opto couplers 109, 124 are also connected to circuitry 142 for sensing faults in the two DC circuits described above. In circuitry 142, an EXCLUSIVE OR gate 143 receives the output signals from the opto couplers and delivers a high output only if one of the opto coupler outputs is high and the other is low. The output of EXCLUSIVE OR gate 143 is connected both directly to an AND gate 144, and indirectly via two delaying buffers 145, 146 to the same AND gate 144. The output of AND gate 144 goes high (indicating a fault in the phantom circuitry) only when the output of EXCLUSIVE OR gate 143 is presently high and was high a short time ago (represented by the delay in passing through buffers 145, 146).- Thus, buffers 145, 146 serve as a deglitcher to reduce the likelihood of generating erroneous fault signals.

The output of AND gate 144 is connected by fault line 152 to trigger a bypass relay driver 147 for driving a relay coil 148 which is electromagnetically coupled to relay armatures 149, 150 of bypass relay 151. Bypass relay armatures 149, 150 are normally in the position shown which allows information packets on the token ring network to pass between an 802.5 SIU and line 12. When relay coil 148 is powered, armatures 149, 150 are switched to the opposite position, and connect lines 12 together via wires X, Y, thus bypassing faulty SIU 24.

Fault line 152 is also connected via buffer 153 to an LED-type fault indicator (not shown).

Figure 3:
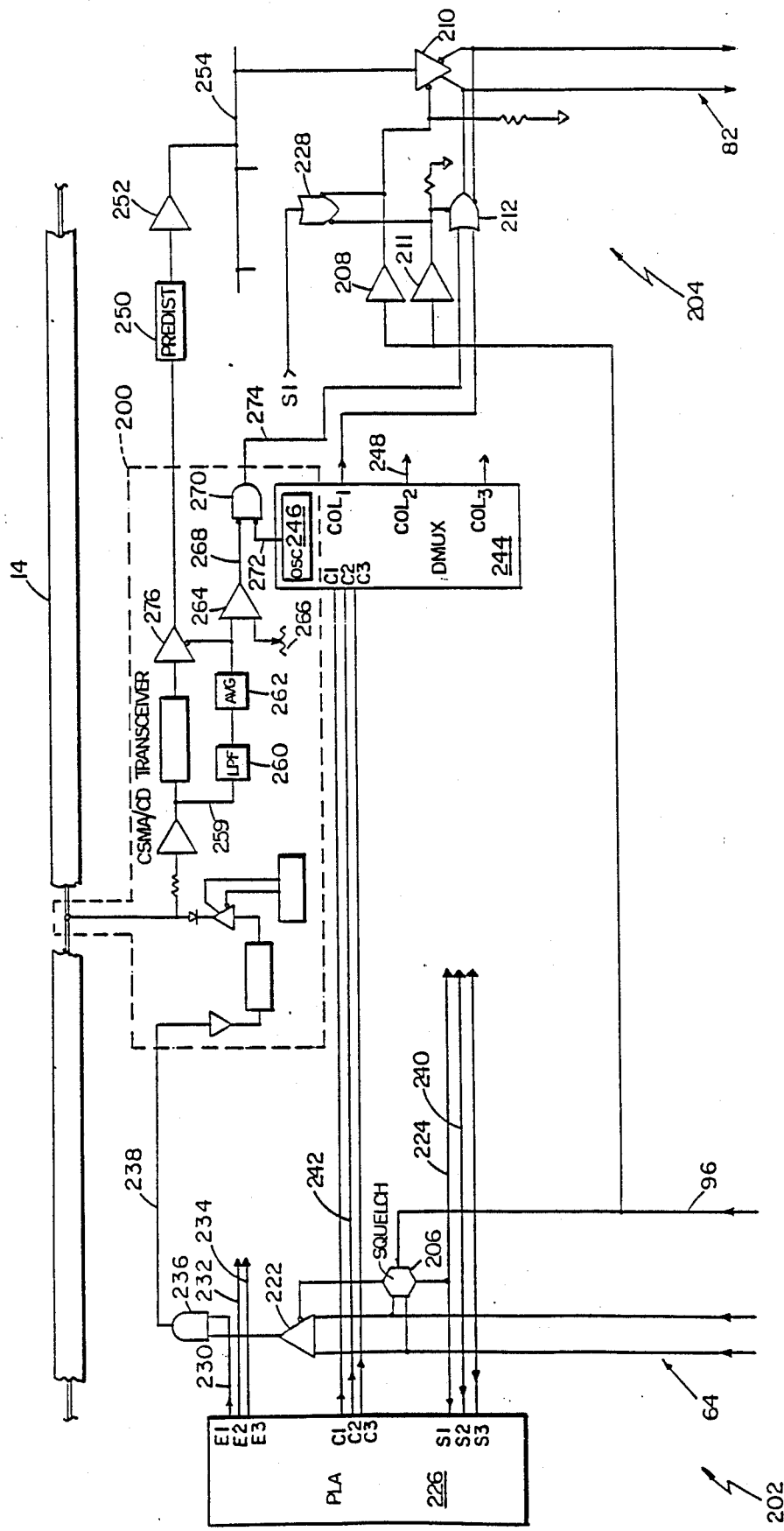

Referring to FIG. 3, the circuit 51 of concentrator 10a includes CSMA/CD transceiver circuitry 200, collision avoidance circuitry 202, and receive drive circuitry 204, all as more fully illustrated and described in the copending application. Transmit line 64 and receive line 82 are respectively connected to the circuitry of FIG. 3. Trigger line 96 is connected to squelch 206 (for deactivating the squelch circuitry when a trigger signal appears on line 96), and via buffer 208 to the enabling input of receive buffer 210 (for disabling the receive buffer when a trigger signal appears on line 96), and via buffer 211 to the enabling input of collision gate 212 (for disabling the collision gate when a trigger signal appears on line 96).

Within concentrator 10a, a transmitted message packet on line 64 is carried to buffer 222 (identical to other buffers, not shown) and activates squelch 206 (identical to other squelches, not shown), which sends a signal ($S_1$) via line 224 to PLA (programmable logic array) 226, and via gate 228 to collision gate 212 (which is enabled, thereby allowing collision signals, if any, to pass through it to SIU 24 via line 82), and to receive buffer 210 (which closes, thereby not allowing received packets onto line 82). Other identical collision gates and receive buffers serve other SIUs.

If PLA 226 receives no other signal from other squelches, it sends an enabling signal ($E_1$) via line 230 (identical to lines 232, 234) to gate 236 (identical to other gates, not shown), which is enabled and allows the transmitted packet onto transmission bus 238, from which it propagates to standard transceiver circuitry 200 (e.g., circuitry such as that of Digital Equipment Corporation Model H-4000 Ethernet Transceiver), which has, in general, conventional circuitry (including an equalizer) to condition both transmitted and received packets, to limit the length of transmitted packets, and to sense collisions on bus 14. Transceiver 200 broadcasts the transmitted packet throughout the LAN for pickup by its addressee device.

At times, a transmitted packet from SIU 24 arrives at concentrator 10a via line 64 just ahead of a transmitted packet from another SIU. The second packet activates a squelch (not shown) identical to squelch 206, which sends a signal ($S_2$) over line 240 that enables a collision gate (not shown) identical to collision gate 212, closes a receive buffer (not shown) identical to receive buffer 210 and reaches PLA 226 just after signal ($S_1$) does. PLA 226 senses that signal ($S_1$) was absolutely first, and sends a signal ($E_1$) via line 230 that enables gate 236

(permitting the first transmitted packet to pass to transmitter bus 238, and to transceiver 200 for broadcasting throughout the LAN). PLA 226 also sends a signal ($C_2$) via line 242 to demultiplexer (DMUX) 244, which sends a collision signal (generated by 10 MHz oscillator 246) via line 248 to a collision gate (not shown) identical to collision gate 212, through which it passes for transmission back to the NIU that had originated the second transmitted packet. This collision signal is "private"; that is, only the NIU that was the source of the second transmission receives it; whereupon the NIU withdraws the transmission. In addition, PLA 226 does not send a signal ($E_2$) to enable a gate (not shown) identical to gate 236, through which the second transmitted packet would have passed had it been absolutely first.

In general, received packets from any source in the LAN pass through the receiver circuitry of transceiver 200, through predistortion circuit 250 and buffer 252, and onto receiver bus 254, from which they move through each of receive buffers, e.g., receive buffer 210, to be read by appropriate addressees.

Collisions on bus 14 between packets from separate subnetworks cause collision signals to be sent by each concentrator in the LAN to all SIUs, as distinguished from the "private" signalling for collision avoidance within a subnetwork, discussed above. When more than one packet is on bus 14, the voltage level drops below the level when only one packet is on the line. A subcircuit within transceiver 200 monitors the voltage level and, whenever it detects such a drop, causes a collision signal to pass to all NIUs in the subnetwork, as follows. Energy passes first through low pass filter 260 (which taps into the conventional receiver circuitry via line 259) and moves through DC voltage averaging circuit 262 to comparator 264, which also receives from trim pot 266 a standard signal whose voltage level is slightly lower (to compensate for noise on the line) than the voltage level on bus 14 when two packets are on it. Whenever comparator 264 in comparing the two voltage levels thus detects a collision on the bus, it sends an enabling signal over line 268 to gate 270 (connected also by line 272 to oscillator 246), which then opens to permit a 10 MHz collision signal from oscillator 246 to pass via line 274 to each of the collision gates, e.g., 212, through which it passes to all transmitting SIUs and NIUs, which withdraw their transmissions. In addition, gate 276 in the receiver circuit is connected to DC voltage averaging circuit 262 and is disabled when it detects a drop in voltage on bus 14, thus preventing received packets from passing from transceiver 200 to predistortion circuit 250.

OPERATION

When an 802.3 type SIU is plugged into a wallplate of the concentrator, no DC signals are carried to opto couplers 109, 124. The signal on trigger line 96 remains low, relay drivers 92, 94 are deactivated, and the corresponding relay armatures remain in the position shown. In that position information packets are passed through between SIU 24 and the concentrator circuitry of FIG. 3, which handles them in accordance with the 802.3 network standard. At the same time, token ring standard line 12 bypasses the concentrator circuitry of FIG. 2.

When an 802.5 type SIU is plugged into the wallplate and its input 101 is driven low, low DC signals are carried to the opto couplers and, so long as the outputs of the opto couplers remain low, a high signal appears on trigger line 96. The high signal on trigger line 96 activates relay coils 89, 91, throwing the associated relay armatures to their 802.5 position (which effectively connects SIU 24 into the 802.5 network). The high signal on line 96 also inhibits the 802.3 transmit squelch, receive drive, and collision avoidance circuitry of FIG. 3, thus preventing noise from passing back to SIU 24.

The invention thus enables a single concentrator to serve devices compatible with different networking modes automatically using signals generated by phantom circuitry already present in devices compatible with one of the networking modes. The two DC circuits each follow a path which includes a part of the split winding of each coupling transformer and one wire of each twisted pair, which maximizes the likelihood of detecting faults in the circuitry. The fault circuitry effectively and simply detects the faults, while the deglitcher minimizes the likelihood of erroneous fault signals. The token ring network automatically bypasses any faulty token ring device. When a token ring device is being served, the CSMA circuitry is inhibited to reduce the transmission of noise back through the concentrator to that device.

Should either one or the other (but not both) of the opto couplers be delivering a high signal, the deglitching circuitry detects the fault, sends a signal to the LED fault indicator, and throws the bypass relay which effectively connects line 12 to bypass the faulty SIU.

Other embodiments are within the following claims. E.g., referring to FIG. 2, line 12 could be replaced by a fiber optics cable 221 connected via an electro-optical converter 223 (both shown by dashed lines). Also, the system can be extended to enable handling of more than two different networking modes.

I claim:

1. A method for use with a data communication networking system of the kind that includes at least two different networks, with messages being carried one each network among a plurality of data handling devices, a given data handling device being adapted to communicate on one of said networks but not on the other network, said method comprising
    connecting any one of said data handling devices to a port adapted to physically connect said data handling device to either of said networks,
    detecting information provided by said data handling device via said port that indicates on which of said networks said device is adapted to communicate, and
    responding to said detected information at said port by selectively connecting said data handling device by physical connections to the network on which it is adapted to communicate, and physically disconnecting said data device from said other network.

2. Apparatus for use in a data communication networking system of the kind that includes at least two different networks, with messages being carried on each network among a plurality of data handling devices, a given data handling device being adapted to communicate on one of said networks but not on the other network, said apparatus comprising
    a port for connection of any one of said data handling devices, said port being adapted to physically connect said data handling device to either of said networks,
    means for detecting information provided by said data handling device via said port that indicates on which of said networks said device is adapted to communicate, and connection circuitry associated with said port and responsive to said detecting means for selectively connecting said data handling device by physical connections to the network on which it is adapted to communicate, and physically disconnecting said data handling device from said other network.

* * * * *